(12) United States Patent
Bargmann et al.

(10) Patent No.: US 7,562,827 B2
(45) Date of Patent: Jul. 21, 2009

(54) USE OF AN ADHESIVE FILM FOR IMPLANTING ELECTRICAL MODULES INTO A CARD BODY

(75) Inventors: Renke Bargmann, Hamburg (DE); Marc Husemann, Hamburg (DE)

(73) Assignee: Tesa SE, Hamburg (DE)

( * ) Notice: Subject to any disclaimer, the term of this patent is extended or adjusted under 35 U.S.C. 154(b) by 324 days.

(21) Appl. No.: 10/569,339

(22) PCT Filed: Aug. 20, 2004

(86) PCT No.: PCT/EP2004/009345

§ 371 (c)(1),
(2), (4) Date: Nov. 7, 2006

(87) PCT Pub. No.: WO2005/021671

PCT Pub. Date: Mar. 10, 2005

(65) Prior Publication Data
US 2007/0138296 A1 Jun. 21, 2007

(30) Foreign Application Priority Data
Aug. 22, 2003 (DE) ................. 103 39 199

(51) Int. Cl.
*G06K 7/10* (2006.01)
(52) U.S. Cl. .......... 235/492; 235/488; 347/50; 428/447; 428/413; 428/523; 428/407
(58) Field of Classification Search ........... 235/498, 235/488; 347/50; 428/447, 413, 523, 407
See application file for complete search history.

(56) References Cited

U.S. PATENT DOCUMENTS

| | | | |
|---|---|---|---|
| 3,326,741 A | 6/1967 | Olson | |
| 3,639,500 A | 2/1972 | Muny et al. | |
| 4,404,246 A | 9/1983 | Charbonneau et al. | |
| 4,404,345 A | 9/1983 | Janssen | |
| 4,452,955 A | 6/1984 | Boeder | |
| 4,545,843 A | 10/1985 | Bray | |
| 4,880,683 A | 11/1989 | Stow | |
| 5,593,759 A | 1/1997 | Vargas et al. | |
| 6,210,522 B1 * | 4/2001 | Singh et al. | 347/50 |

(Continued)

FOREIGN PATENT DOCUMENTS

DE 199 48 560 A1 8/2001

(Continued)

OTHER PUBLICATIONS

Carroy, A. et al; Chemistry & Technology of UV & EB Formulation for Coatings, Inks & Paints; vol. 5, Edited by P.K.T. Oldring; Chapter III; "Formulations for Cationic Radiation Curable Coatings"; pp. 102-143.

(Continued)

*Primary Examiner*—Allyson N Trail
(74) *Attorney, Agent, or Firm*—Norris McLaughlin & Marcus, PA (57) ABSTRACT

The invention relates to the use of an adhesive film for bonding a chip module in a card body. Said adhesive film comprises at least two adhesive layers (i) and (ii), which differ chemically from one another.

10 Claims, 1 Drawing Sheet

U.S. PATENT DOCUMENTS

| | | | |
|---|---|---|---|
| 6,565,969 B1 | 5/2003 | Lamon et al. | |
| 2003/0085380 A1* | 5/2003 | Schuhmacher et al. | ... 252/299.7 |
| 2007/0184290 A1* | 8/2007 | Ando et al. | ................. 428/447 |

FOREIGN PATENT DOCUMENTS

| | | | |
|---|---|---|---|
| EP | 0 842 995 B1 | 5/1998 | |
| EP | 1 078 965 A2 | 2/2001 | |

OTHER PUBLICATIONS

Fox, T.G.; "Influence of Diluent and of Copolymer Composition on the Glass Temperature of a Polymer System"; Bull, Am. Phys. Soc.; Session J; p. 123 (1956).

Fouassier, Jean-Pierre; Photoinitiation, Photopolymerization, and Photocuring Fundamentals and Applications; Hanser/Gardner Publications, Inc., Cincinnati, 1995; pp. ix-375.

* cited by examiner

USE OF AN ADHESIVE FILM FOR IMPLANTING ELECTRICAL MODULES INTO A CARD BODY

The invention relates to the use of an adhesive film for bonding electrical modules (chips) in card bodies.

For the implanting of electrical modules in card bodies the prior art has already disclosed a multiplicity of adhesive films or joining methods. The aim of such implantations is to produce telephone cards, credit cards, parking machine cards, insurance cards, etc. Examples of the corresponding adhesive bonding methods are found for example in patents EP 0 842 995, EP 1 078 965, and DE 199 48 560.

In this field of adhesive bonding, the bar is continually being raised as regards the requirements imposed on the adhesive system. For instance, the adhesive is required to adhere well to polycarbonate, to ABS, PVC, and PET, and also to the electrical module. Bonding here is generally to epoxy materials or polyimide. At one time cyanoacrylates were used as liquid adhesives, and have the advantage of optimum wetting of both the card body and the electrical chip. This technology, however, is dying out, since the operations were very slow. The evaporation of the solvent from the cavity in the card body was slow; the metering nozzles became blocked during downtime, as a result of drying out, and were also of poor meterability; and the liquid adhesive likewise required a certain time for curing. As a result, the quality of the adhesive bond was decidedly poor.

Pressure-sensitive hotmelt adhesives prove markedly superior to the liquid adhesives here. Nevertheless, here as well, the selection of appropriate compounds is very limited, since extremely exacting requirements are imposed on this joining technique. One restriction is imposed by the very different materials which must be bonded. As a result of the very different polarities of PC (polycarbonate), PVC (polyvinyl chloride), PET (polyethylene terephthalate), ABS (acrylonitrile-butadiene-styrene copolymers), epoxy materials, and polyimides, it is impossible to find a single polymer which adheres equally well to all materials. Furthermore, the requirements of the end customers are becoming increasingly stringent. For example, the planarity of the electrical module with the card body is an important criterion, since otherwise the cards could no longer be read. This imposes an upper limit on the implantation temperatures, since otherwise deformations occur.

A further criterion is the requirement from the banking sector that the electrical modules should not be removable without destruction. Consequently the internal cohesion of the adhesive must be very high, so that it does not split in the middle and so that the adhesion to either side (card body and electrical module) is extremely high. At the same time the adhesive is also required to exhibit very high flexibility, since following implantation the cards go through torsion tests and flexural testing. The card material ought preferably to rupture first, before the failure of the adhesion to the card body and to the electrical module. In general not even edge lifting is tolerated. A further criterion are temperature fluctuations and the effect of moisture, since in their subsequent use these cards are required to withstand both high and low temperatures and in some cases must even survive a passage through the wash. Consequently the adhesive should not become brittle at low temperatures, should not liquefy at high temperatures, and should possess a low tendency to absorb water. A further requirement criterion is the processing speed, as a result of the growing number of cards needed. The adhesive ought to soften or melt very quickly, in order that the implanting operation can be concluded within a second.

In the light of this prior art, the invention is based on the object of improving the implanting of electrical modules into a card body in which the criteria set out above are met and in which in particular a very high level of adhesion to the different card bodies and electrical modules is achieved.

BRIEF DESCRIPTION OF THE DRAWINGS

The invention will now be described in greater detail with reference to the drawings, wherein.

Figure 1:
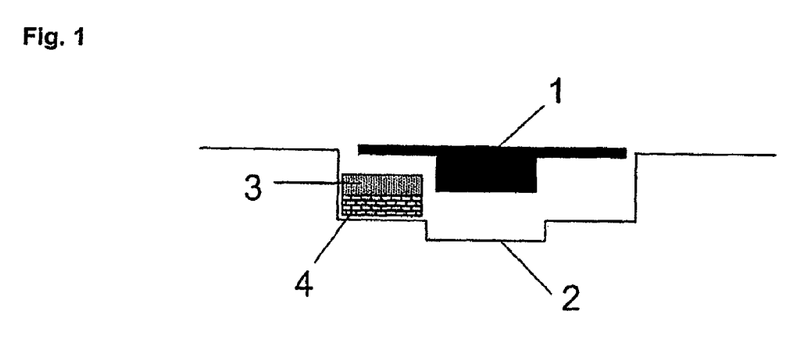
FIG. 1 is a schematic of one construct according to the present invention.

In accordance with the invention this object is achieved by the use of an adhesive film which is designed in two layers, in which one layer has very good adhesion to the different card bodies and the other layer exhibits very good adhesion to the electrical module. In this respect see FIG. 1, which shows:

| | |
|---|---|
| 1 | an electrical module (chip) |
| 2 | the card body |
| 3 | adhesive layer (i) |
| 4 | adhesive layer (ii). |

Adhesive layers (i) and (ii) may have the same or different thicknesses. The adhesive assembly as a whole in one preferred embodiment possesses a layer thickness of between 10 and 125 µm. In a further preferred embodiment adhesive layer (i) exhibits between 5 and 90 µm, adhesive layer (ii) likewise between 5 and 90 µm.

Figure 2:
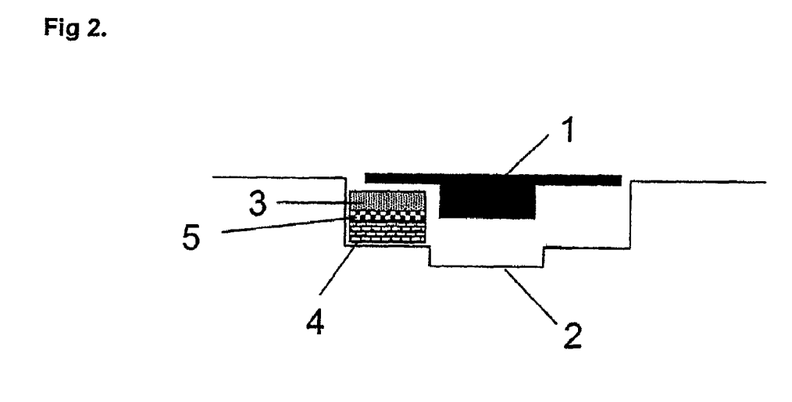
FIG. 2 is a schematic of a second construct according to the present invention.

In a further embodiment of the invention there may be further ("third") layers present between the two adhesive layers (i) and (ii) (these layers are also referred to below as "interlayers"), especially primer, barrier and/or carrier layers, it also being possible for these functions to be combined in one or more of the further layers. In this regard compare FIG. 2, where the identifications correspond to those in FIGS. 1 and 5 is an interlayer (primer/barrier layer/carrier).

The thickness of the interlayers in one preferred embodiment is between 0.5 and 100 µm. Adhesive layers (i) and (ii) and the further layers differ in respect of their chemical composition.

Adhesive Layer (i)

Adhesive layer (i), aligned to the bonding of the electrical module, is required to exhibit good adhesion to epoxy materials and polyimides.

In one preferred version thermoplastic materials are used for this purpose which by virtue of their melting achieve effective wetting of the epoxy or polyimide surface. The following polymers are used here with particular preference: polyesters, polyamides, copolyamides, and copolyesters. Suitable for the inventive purpose are, however, polyurethanes, ethylene-vinyl acetates, synthetic rubbers, such as styrene-isoprene diblock and triblock copolymers (SIS), styrene-butadiene diblock and triblock copolymers (SBS), styrene-ethylene-butadiene diblock and triblock copolymer (SEBS), polyvinyl acetate, polyimides, polyethers, copolyamides, copolyesters, polyolefins, such as polyethylene, polypropylene or poly(meth)acrylates, for example.

Layer (i) therefore comprises adhesives which become tacky under temperature exposure and optional pressure and which, after bonding and cooling, as a result of solidification, develop a high bond strength to polyimide or epoxy materials.

The bond strength is with particular preference so high that, following the implanting operation, the electrical module can no longer be removed without destruction. Depending on the implanting temperature, these heat-activatable adhesives have different static glass transition temperatures $T_{g,A}$ or a melting point $T_{m,A}$. In one very preferred range the $T_{g,A}$ or $T_{m,A}$ is situated in a range between +55° C. and 150° C.

To optimize the technical adhesive properties and the activation range it is possible to add bond-strength-increasing resins or reactive resins, preferably without this causing a reaction between these resins and the adhesive.

Tackifying resins for addition which can be used are the tackifier resins already known and described in the literature. Representatives that may be mentioned include pinene resins, indene resins, and rosins, their disproportionated, hydrogenated, polymerized, and esterified derivatives and salts, the aliphatic and aromatic hydrocarbon resins, terpene resins and terpene-phenolic resins, and also C5, C9, and other hydrocarbon resins. Any desired combinations of these and further resins may be used in order to adjust the properties of the resultant adhesive in accordance with requirements. Generally speaking, it is possible to use all resins that are compatible (soluble) with the corresponding thermoplastic; in particular, reference may be made to all aliphatic, aromatic, and alkylaromatic hydrocarbon resins, hydrocarbon resins based on single monomers, hydrogenated hydrocarbon resins, functional hydrocarbon resins, and natural resins. Attention is drawn expressly to the depiction of the state of knowledge in the "Handbook of Pressure Sensitive Adhesive Technology" by Donatas Satas (van Nostrand, 1989).

As adhesive for layer (i) it is additionally possible to use heat-activatable adhesives which are composed of an elastomer and at least one reactive resin. Elastomers used in this case are preferably rubbers, polychloroisoprenes, polyacrylates, nitrile rubbers, epoxidized nitrile rubbers, etc. Examples of suitable reactive resins include phenolic resins, epoxy resins, melamine resins, resins having isocyanate functions, or mixtures of the aforementioned resins. In combination with the reactive systems it is also possible to add a multiplicity of other resins, filler materials, catalysts, ageing inhibitors, etc.

One very preferred group comprises epoxy resins. The molecular weight (weight average Mw) of the epoxy resins varies from 100 g/mol up to a maximum of 10,000 g/mol for polymeric epoxy resins.

The epoxy resins comprise, for example, the reaction product of bisphenol A and epichlorohydrin, the reaction product of phenol and formaldehyde (Novolak resins) and epichlorohydrin, glycidyl esters, the reaction product of epichlorohydrin and p-aminophenol.

Preferred commercial examples are Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071 and HPT™ 1079, likewise from Shell Chemical.

Examples of commercial aliphatic epoxy resins are vinylcyclohexane dioxides, such as ERL-4206, ERL-4221, ERL 4201, ERL-4289 or ERL-0400 from Union Carbide Corp.

Examples of Novolak resins which can be used include Epi-Rez™ 5132 from Celanese, ESCN-001 from Sumitomo Chemical, CY-281 from Ciba Geigy, DEN™ 431, DEN™ 438, and Quatrex 5010 from Dow Chemical, RE 305S from Nippon Kayaku, Epiclon™ N673 from DaiNippon Ink Chemistry or Epikote™ 152 from Shell Chemical.

Furthermore, as reactive resins it is also possible to use melamine resins, such as Cymel™ 327 and 323 from Cytec, for example.

Furthermore, as reactive resins it is also possible to use terpene-phenolic resins, such as NIREZ™ 2019 from Arizona Chemical, for example.

Furthermore as reactive resins it is also possible to use phenolic resins, such as YP 50 from Toto Kasei, PKHC from Union Carbide Corp., and BKR 2620 from Showa Union Gosei Corp., for example.

Furthermore, as reactive resins it is also possible to use polyisocyanates, such as Coronate™ L from Nippon Polyurethane Ind., Desmodur™ N3300 or Mondur™ 489 from Bayer, for example.

In a further preferred version adhesives based on poly (meth)acrylate are employed. Great preference is given to using polymers composed of polymers formed from at least the following monomers a1) 70% to 100% by weight of acrylic esters and/or methacrylic esters and/or the free acids thereof, with the following formula where $R_1$=H and/or $CH_3$ and $R_2$=H and/or alkyl chains having 1 to 30 carbon atoms.

Furthermore, for the preparation of the polymers, the following monomers are optionally added:

a2) up to 30% by weight of olefinically unsaturated monomers having functional groups.

In one very preferred version, monomers a1) used are acrylic monomers comprising acrylic and methacrylic esters having alkyl groups consisting of 1 to 14 carbon atoms. Specific examples, without wishing to be restricted by this enumeration, are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and the branched isomers thereof, such as 2-ethylhexyl acrylate. Further classes of compound for use, which may likewise be added in small amounts under a1), are cyclohexyl methacrylates, isobornyl acrylate, and isobornyl methacrylates.

In one advantageous variant acrylic monomers corresponding to the following general formula are employed for a2):

where $R_1$=H and/or $CH_3$ and the radical —$OR_2$ represents or includes a functional group which assists subsequent UV crosslinking of the pressure-sensitive adhesive—which for example, in one particularly preferred version, possesses an H donor effect.

Particularly preferred examples for component a2) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide, and glyceridyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, and dimethylacrylic acid, this enumeration not being conclusive.

In a further preferred version aromatic vinyl compounds are used for compound a2), the aromatic nuclei being composed preferably of $C_4$ to $C_{18}$ units and being able also to include hetero atoms. Particularly preferred examples are styrene, 4-vinylpyridine, N-vinylphthalimide, methylstyrene, 3,4-dimethoxystyrene, and 4-vinylbenzoic acid, this enumeration not being conclusive.

For the polymerization the monomers are chosen such that the resultant polymers can be employed as heat-activatable adhesives, especially such that the resultant polymers have adhesive properties in accordance with the "Handbook of Pressure Sensitive Adhesive Technology" by Donatas Satas (van Nostrand, New York 1989). For these applications the static glass transition temperature of the resultant polymer is advantageously above 30° C. In order to achieve a polymer glass transition temperature $T_{g,A}$ of $T_{g,A} \geqq 30°$ C., in accordance with the remarks above, the monomers are very preferably selected, and the quantitative composition of the monomer mixture advantageously chosen, such that according to the Fox equation (E1) (cf. T. G. Fox, Bull. Am. Phys. Soc. 1 (1956) (123)) the desired $T_{g,A}$ value is produced for the polymer.

$$\frac{1}{T_g} = \sum_n \frac{w_n}{T_{g,n}} \quad (E1)$$

In this equation n represents the serial number of the monomers employed, $w_n$ the mass fraction of the respective monomer n (% by weight), and $T_{g,n}$ the respective glass transition temperature of the homopolymer of the respective monomers n, in K.

For anchoring the heat-activatable polymers of layer (i) it may be of advantage if the polymer is treated by corona or plasma prior to coating. Examples of instruments suitable for atmospheric plasma treatment are those from Plasmatreat. Furthermore, for the operation and for the anchoring of the layer (i) to the layer (ii), it may be of advantage if chemical anchoring takes place via, for example, a primer.

In a further preferred embodiment of the pressure-sensitive adhesive tape of the invention, polyolefins, especially poly-α-olefins, are used, in the sense of layer (i), which have a softening range of more than 30° C. and less than 150° C. and which likewise solidify again after bonding, in the course of cooling. The polyolefin-activatable pressure-sensitive adhesives have static glass transition temperatures $T_{g,A}$ or melting points $T_{m,A}$, in one preferred embodiment, of +65° C. to 140° C. The bond strength of these polymers can be increased by targeted additizing. Thus, for example, polyimine or polyvinylacetate copolymers can be used as bond strength promoter additives.

In order to achieve the desired static glass transition temperature $T_{g,A}$ or the melting point $T_{m,A}$, the monomers employed and also their amounts, here again, are preferably chosen again such that the desired temperature results when applying the Fox equation (E1).

As well as the monomer or comonomer composition for controlling the glass transition temperature, the molecular weight (weight average Mw) can be varied. In order to set a low static glass transition temperature $T_{g,A}$ or melting point $T_{m,A}$, polymers having a moderate or low molecular weight (weight average Mw) are used. It is also possible to mix together polymers of low and high molecular weight. In particularly preferred versions polyethylenes, polypropenes, polybutenes, polyhexenes or copolymers of polyethylene, polypropene, polybutene or polyhexene are employed.

Available commercially from Degussa under the trade name Vestoplast™ are various heat-activatable poly-α-olefins. Propene-rich grades are offered under the names Vestoplast™ 703, 704, 708, 750, 751, 792, 828, 888 or 891. They possess melting points $T_{m,A}$ of 99 to 162° C. Furthermore, butene-rich grades are also available commercially, under the names Vestoplast™ 308, 408, 508, 520, and 608. They possess melting points $T_{m,A}$ of 84 to 157° C.

Further examples of heat-activatable pressure-sensitive adhesives are described in patents U.S. Pat. Nos. 3,326,741, 3,639,500, 4,404,246, 4,452,955, 4,545,843, 4,880,683 and 5,593,759. In these patents there are likewise references to further temperature-activatable pressure-sensitive adhesives.

Adhesive (ii)

Adhesive layer (ii) is chosen such that it differs (i) in its chemical composition from layer (i). Adhesive layer (ii) possesses very good adhesion to PC and/or ABS and/or PET and/or PVC. In one very preferred version the adhesion to these materials is so high that the electrical module can no longer be removed from the card body without destruction. Depending on the implanting temperature, the heat-activatable adhesives for adhesive layer (ii) have different static glass transition temperatures $T_{g,A}$ or a melting point $T_{m,A}$. In one very preferred range the $T_{g,A}$ or $T_{m,A}$ is situated in a range between +55° C. and 150° C.

In one preferred version thermoplastic materials are used for this purpose which by virtue of their melting achieve effective wetting of the card surface. The following polymers are used here with particular preference: polyurethanes and/or synthetic rubbers, such as styrene-isoprene diblock and triblock copolymers (SIS), styrene-butadiene diblock and triblock copolymers (SBS), and styrene-ethylene-butadiene diblock and triblock copolymers (SEBS).

Additionally it is also possible in accordance with the invention to employ polyesters, polyamides, ethylene-vinyl acetates, polyvinyl acetate, polyimides, polyethers, copolyamides, copolyesters, polyolefins, such as polyethylene, polypropylene and/or poly(meth)acrylates.

To optimize the technical adhesive properties and the activation range it is possible to add bond-strength-increasing resins or reactive resins.

Tackifying resins for addition which can be used are all the tackifier resins already known and described in the literature, without exception. Representatives that may be mentioned include pinene resins, indene resins, and rosins, their disproportionated, hydrogenated, polymerized, and esterified derivatives and salts, the aliphatic and aromatic hydrocarbon resins, terpene resins and terpene-phenolic resins, and also C5, C9, and other hydrocarbon resins. Any desired combinations of these and further resins may be used in order to adjust the properties of the resultant adhesive in accordance with requirements. Generally speaking, it is possible to use all resins that are compatible (soluble) with the corresponding thermoplastic; in particular, reference may be made to all aliphatic, aromatic, and alkylaromatic hydrocarbon resins, hydrocarbon resins based on single monomers, hydrogenated hydrocarbon resins, functional hydrocarbon resins, and natural resins. Attention is drawn expressly to the depiction of the state of knowledge in the "Handbook of Pressure Sensitive Adhesive Technology" by Donatas Satas (van Nostrand, 1989).

In a further preferred embodiment use is made of heat-activatable adhesives which are composed of an elastomer and at least one reactive resin. Elastomers used in this case are preferably rubbers, polychloroisoprenes, polyacrylates, nitrile rubbers, epoxidized nitrile rubbers, etc. Examples of suitable reactive resins include phenolic resins, epoxy resins, melamine resins, resins having isocyanate functions, or mixtures of the aforementioned resins. In combination with the reactive systems it is also possible to add a multiplicity of other resins, filler materials, catalysts, ageing inhibitors, etc.

One very preferred group comprises epoxy resins. The molecular weight (weight average Mw) of the epoxy resins varies from 100 g/mol up to a maximum of 10,000 g/mol for polymeric epoxy resins.

The epoxy resins comprise, for example, the reaction product of bisphenol A and epichlorohydrin, the reaction product of phenol and formaldehyde (Novolak resins) and epichlorohydrin, glycidyl esters, the reaction product of epichlorohydrin and p-aminophenol.

Preferred commercial examples are Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071 and HPT™ 1079, likewise from Shell Chemical.

Examples of commercial aliphatic epoxy resins are vinylcyclohexane dioxides, such as ERL-4206, ERL-4221, ERL 4201, ERL-4289 or ERL-0400 from Union Carbide Corp.

Examples of Novolak resins which can be used include Epi-Rez™ 5132 from Celanese, ESCN-001 from Sumitomo Chemical, CY-281 from Ciba Geigy, DEN™ 431, DEN™ 438, and Quatrex 5010 from Dow Chemical, RE 305S from Nippon Kayaku, Epiclon™ N673 from DaiNippon Ink Chemistry or Epicote™ 152 from Shell Chemical.

Furthermore, as reactive resins it is also possible to use melamine resins, such as Cymel™ 327 and 323 from Cytec, for example.

Furthermore, as reactive resins it is also possible to use terpene-phenolic resins, such as NIREZ™ 2019 from Arizona Chemical, for example.

Furthermore as reactive resins it is also possible to use phenolic resins, such as YP 50 from Toto Kasei, PKHC from Union Carbide Corp., and BKR 2620 from Showa Union Gosei Corp., for example.

Furthermore, as reactive resins it is also possible to use polyisocyanates, such as Coronate™ L from Nippon Polyurethane Ind., Desmodur™ N3300 or Mondur™ 489 from Bayer, for example.

In order to accelerate the reaction between the two components it is also possible to additive crosslinkers and accelerants into the mixture.

Examples of suitable accelerants include imidazoles, available commercially as 2M7, 2E4MN, 2PZ-CN, 2PZCNS, P0505, and L07N from Shikoku Chem. Corp. or Curezol 2Mz from Air Products.

Furthermore it is also possible to use amines, especially tertiary amines, for acceleration.

In a further preferred version adhesives based on poly(meth)acrylate are employed. Great preference is given to using polymers composed of polymers formed from at least the following monomers
a3) 70% to 100% by weight of acrylic esters and/or methacrylic esters and/or the free acids thereof, with the following formula

$CH_2=CH(R_1)(COOR_2)$, where $R_1$=H and/or $CH_3$ and $R_2$=H and/or alkyl chains having 1 to 30 carbon atoms.

Furthermore, for the preparation of the polymers, the following monomers are optionally added:
a4) up to 30% by weight of olefinically unsaturated monomers having functional groups.

In one very preferred version, monomers a3) used are acrylic monomers comprising acrylic and methacrylic esters having alkyl groups consisting of 1 to 14 carbon atoms. Specific examples, without wishing to be restricted by this enumeration, are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and the branched isomers thereof, such as 2-ethylhexyl acrylate. Further classes of compound for use, which may likewise be added in small amounts under a3), are cyclohexyl methacrylates, isobornyl acrylate, and isobornyl methacrylates.

In one advantageous variant acrylic monomers corresponding to the following general formula are employed for a4):

where $R_1$=H and/or $CH_3$ and the radical —$OR_2$ represents or includes a functional group which assists subsequent UV crosslinking of the pressure-sensitive adhesive—which for example, in one particularly preferred version, possesses an H donor effect.

Particularly preferred examples for component a4) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide, and glyceridyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, and dimethylacrylic acid, this enumeration not being conclusive.

In a further preferred version aromatic vinyl compounds are used for compound a4), the aromatic nuclei being composed preferably of $C_4$ to $C_{18}$ units and being able also to include hetero atoms. Particularly preferred examples are styrene, 4-vinylpyridine, N-vinylphthalimide, methylstyrene, 3,4-dimethoxystyrene, and 4-vinylbenzoic acid, this enumeration not being conclusive.

For the polymerization the monomers are chosen such that the resultant polymers can be employed as heat-activatable adhesives, especially such that the resultant polymers have adhesive properties in accordance with the "Handbook of Pressure Sensitive Adhesive Technology" by Donatas Satas (van Nostrand, New York 1989). For these applications the static glass transition temperature of the resultant polymer is advantageously above 30° C. In order to achieve a polymer glass transition temperature $T_{g,A}$ of $T_{g,A} \geq 30°$ C., in accordance with the remarks above, the monomers are very preferably selected, and the quantitative composition of the monomer mixture advantageously chosen, such that according to the Fox equation (E1) (cf. T. G. Fox, Bull. Am. Phys. Soc. 1 (1956) (123)) the desired $T_{g,A}$ value is produced for the polymer.

$$\frac{1}{T_g} = \sum_n \frac{w_n}{T_{g,n}} \quad \text{(E1)}$$

In this equation n represents the serial number of the monomers employed, $w_n$ the mass fraction of the respective monomer n (% by weight), and $T_{g,n}$ the respective glass transition temperature of the homopolymer of the respective monomers n, in K.

In a further preferred embodiment of the pressure-sensitive adhesive tape of the invention, polyolefins, especially poly-α-olefins, are used, in the sense of layer (i), which have a softening range of more than 30° C. and less than 150° C. and which likewise solidify again after bonding, in the course of cooling. The polyolefin-activatable pressure-sensitive adhesives have static glass transition temperatures $T_{g,A}$ or melting points $T_{m,A}$, in one preferred embodiment, of +65° C. to 140° C. The bond strength of these polymers can be increased by targeted additizing. Thus, for example, polyimine or polyvinylacetate copolymers can be used as bond strength promoter additives.

In order to achieve the desired static glass transition temperature $T_{g,A}$ or the melting point $T_{m,A}$, the monomers employed and also their amounts, here again, are preferably chosen again such that the desired temperature results when applying the Fox equation (E1).

As well as the monomer or comonomer composition for controlling the glass transition temperature, the molecular weight (weight average Mw) can be varied. In order to set a low static glass transition temperature $T_{g,A}$ or melting point $T_{m,A}$, polymers having a moderate or low molecular weight (weight average Mw) are used. It is also possible to mix together polymers of low and high molecular weight. In particularly preferred versions polyethylenes, polypropenes, polybutenes, polyhexenes or copolymers of polyethylene, polypropene, polybutene or polyhexene are employed.

Available commercially from Degussa under the trade name Vestoplast™ are various heat-activatable poly-α-olefins. Propene-rich grades are offered under the names Vestoplast™ 703, 704, 708, 750, 751, 792, 828, 888 or 891. They possess melting points $T_{m,A}$ of 99 to 162° C. Furthermore, butene-rich grades are also available commercially, under the names Vestoplast™ 308, 408, 508, 520, and 608. They possess melting points $T_{m,A}$ of 84 to 157° C.

Further examples of heat-activatable pressure-sensitive adhesives are described in patents U.S. Pat. Nos. 3,326,741, 3,639,500, 4,404,246, 4,452,955, 4,4043345, 4,545,843, 4,880,683 and 5,593,759. In these patents there are likewise references to further temperature-activatable pressure-sensitive adhesives.

Interlayer (Primer Layer/Barrier Layer/Carrier)

In addition to layers (i) and (ii) there may be one or more further layers ("interlayers"), particularly primer, barrier and/or carrier layers, it also being possible for these functions to be united in one or more of the further layers. It is particularly advantageous to provide an interlayer.

The interlayer must adhere well to adhesive layer (i) and (ii). For this purpose it is possible to use pressure-sensitive adhesive materials or thermoplastic materials. In a further preferred version primers are employed.

Suitable primers are all primers known to the skilled worker and available commercially. Thus in one preferred version use is made of Sarans, aziridines or isocyanates, also in combination with one another. As a reactive primer it is preferred to use a difunctional or polyfunctional aziridine or isocyanate, and the primers can be introduced by stirring in a matrix.

As polymeric or prepolymeric compounds with primer suitability it is possible additionally to use compounds having carboxylic acid groups. Examples of suitable polymers include polyurethanes, polyurethane/acrylate copolymers, copolymers or terpolymers of polyalkylenes, polyalkyldienes, polyacrylate esters, polyalkyl esters, polyvinyl esters, polyvinyls with acrylic acid or methacrylic acid. Examples of copolymers are polyethylene/acrylic acid copolymers, polyethylene/methacrylic acid copolymers, polyethylene/methacrylic acid/acrylic acid terpolymers, methyl methacrylates/acrylic acid copolymers, polybutadiene/methacrylic acid copolymers, vinyl chlorides/acrylic copolymers, and mixtures thereof. The preferred polymers and copolymers are polyurethanes, polyethylene/acrylic acid copolymers, and polyethylene/methacrylic acid copolymers. The properties can be varied by way of the number of carboxylic acid groups.

The primers, additionally, may possess reactive groups. Crosslinking compounds for the corresponding blends possess preferably polyfunctional groups. Polyfunctional means that the compounds possess a functionality of greater than or equal to 2.

Suitable crosslinkers comprise, for example, polyfunctional aziridines, polyfunctional carbodiimides, polyfunctional epoxy resins and melamine resins. The preferred crosslinkers are polyfunctional aziridines, such as trimethylpropane tris(B-(N-aziridinyl)propionate, pentaerythritol tris(B-(aziridinyl)propionate, and 2-methyl-2-ethyl-2-((3-(2-methyl-1-aziridinyl)-1-oxopropoxy)methyl)-1,3-propanediyl ester.

Alternatively it is also possible to use primers having hydroxyl groups or amine groups.

For the purpose of solidification it is also possible, furthermore, to use binders. Liquid binders can be applied in solution in water or organic solvents or as a dispersion. For adhesive solidification, binding dispersions are chosen predominantly: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC and the like, and also their copolymers. Normally the dispersions in question are anionically or nonionically stabilized dispersions, although in certain cases cationic dispersions may also be of advantage.

As carrier material, for the interlayer(s) for example, it is possible in this context to use the materials that are customary and familiar to the skilled worker, such as films (polyesters, PET, PE, PP, BOPP, PVC, polyimide, polymethacrylate, PEN, PVB, PVF, polyamide), nonwovens, foams, woven fabrics, and woven films.

For thermoplastic materials it is particularly preferred to use the following polymers, in an enumeration which makes no claim to completeness: polyurethanes, polyesters, polyamides, ethylene-vinyl acetates, synthetic rubbers, such as styrene-isoprene diblock and triblock copolymers (SIS), styrene-butadiene diblock and triblock copolymers (SBS), styrene-ethylene-butadiene diblock and triblock copolymer (SEBS), polyvinyl acetate, polyimides, polyethers, copolyamides, copolyesters, polyolefins, such as polyethylene, polypropylene or poly(meth)acrylates.

The interlayer (primer/barrier layer/carrier) further comprises adhesives which become tacky under temperature exposure and optional pressure and which after bonding and cooling exhibit, as a result of the solidification, high bond strength to adhesive layers (i) and (ii).

These heat-activatable adhesives possess different static glass transition temperatures $T_{g,A}$ or melting points $T_{m,A}$. In one very preferred pressure range the $T_{g,A}$ or $T_{m,A}$ is situated within a range between +25° C. and 250° C.

To optimize the technical adhesive properties and the activation range it is possible to add bond-strength-increasing resins or reactive resins.

Tackifying resins for addition which can be used are the tackifier resins already known and described in the literature. Representatives that may be mentioned include pinene resins, indene resins, and rosins, their disproportionated, hydrogenated, polymerized, and esterified derivatives and salts, the aliphatic and aromatic hydrocarbon resins, terpene resins and terpene-phenolic resins, and also C5, C9, and other hydrocarbon resins. Any desired combinations of these and further resins may be used in order to adjust the properties of the resultant adhesive in accordance with requirements. Generally speaking, it is possible to use all resins that are compatible (soluble) with the corresponding thermoplastic; in particular, reference may be made to all aliphatic, aromatic, and alkylaromatic hydrocarbon resins, hydrocarbon resins based on single monomers, hydrogenated hydrocarbon resins, functional hydrocarbon resins, and natural resins. Attention is drawn expressly to the depiction of the state of knowledge in the "Handbook of Pressure Sensitive Adhesive Technology" by Donatas Satas (van Nostrand, 1989).

In a further preferred embodiment use is made of heat-activatable adhesives for the interlayer which are composed of an elastomer and at least one reactive resin. Elastomers used in this case are preferably rubbers, polychloroisoprenes, polyacrylates, nitrile rubbers, epoxidized nitrile rubbers, etc. Examples of suitable reactive resins include phenolic resins, epoxy resins, melamine resins, resins having isocyanate functions, or mixtures of the aforementioned resins. In combination with the reactive systems it is also possible to add a multiplicity of other resins, filler materials, catalysts, ageing inhibitors, etc.

One very preferred group comprises epoxy resins. The molecular weight (weight average Mw) of the epoxy resins varies from 100 g/mol up to a maximum of 10,000 g/mol for polymeric epoxy resins.

The epoxy resins comprise, for example, the reaction product of bisphenol A and epichlorohydrin, the reaction product of phenol and formaldehyde (Novolak resins) and epichlorohydrin, glycidyl esters, the reaction product of epichlorohydrin and p-aminophenol.

Preferred commercial examples are Araldite™ 6010, CY-281™, ECN™ 1273, ECN™ 1280, MY 720, RD-2 from Ciba Geigy, DER™ 331, DER™ 732, DER™ 736, DEN™ 432, DEN™ 438, DEN™ 485 from Dow Chemical, Epon™ 812, 825, 826, 828, 830, 834, 836, 871, 872, 1001, 1004, 1031 etc. from Shell Chemical, and HPT™ 1071 and HPT™ 1079, likewise from Shell Chemical.

Examples of commercial aliphatic epoxy resins are vinylcyclohexane dioxides, such as ERL-4206, ERL-4221, ERL 4201, ERL-4289 or ERL-0400 from Union Carbide Corp.

Examples of Novolak resins which can be used include Epi-Rez™ 5132 from Celanese, ESCN-001 from Sumitomo Chemical, CY-281 from Ciba Geigy, DEN™ 431, DEN™ 438, and Quatrex 5010 from Dow Chemical, RE 305S from Nippon Kayaku, Epiclon™ N673 from DaiNippon Ink Chemistry or Epicote™ 152 from Shell Chemical.

Furthermore, as reactive resins it is also possible to use melamine resins, such as Cymel™ 327 and 323 from Cytec, for example.

Furthermore, as reactive resins it is also possible to use terpene-phenolic resins, such as NIREZ™ 2019 from Arizona Chemical, for example.

Furthermore as reactive resins it is also possible to use phenolic resins, such as YP 50 from Toto Kasei, PKHC from Union Carbide Corp., and BKR 2620 from Showa Union Gosei Corp., for example.

Furthermore, as reactive resins it is also possible to use polyisocyanates, such as Coronate™ L from Nippon Polyurethane Ind., Desmodur™ N3300 or Mondur™ 489 from Bayer, for example.

In order to accelerate the reaction between the two components it is also possible to additive crosslinkers and accelerants into the mixture.

Examples of suitable accelerants include imidazoles, available commercially as 2M7, 2E4MN, 2PZ-CN, 2PZCNS, P0505, and L07N from Shikoku Chem. Corp. or Curezol 2MZ from Air Products.

Furthermore it is also possible to use amines, especially tertiary amines, for acceleration.

In a further preferred version for the interlayer adhesives or heat-activatable adhesives based on poly(meth)acrylate are employed. Great preference is given to using polymers composed of polymers formed from at least the following monomers a5) 70% to 100% by weight of acrylic esters and/or methacrylic esters and/or the free acids thereof, with the following formula $CH_2=CH(R_1)(COOR_2)$, where $R_1$=H and/or $CH_3$ and $R_2$=H and/or alkyl chains having 1 to 30 carbon atoms.

Furthermore, for the preparation of the polymers, the following monomers are optionally added:

a6) up to 30% by weight of olefinically unsaturated monomers having functional groups.

In one very preferred version, monomers a5) used are acrylic monomers comprising acrylic and methacrylic esters having alkyl groups consisting of 1 to 14 carbon atoms. Specific examples, without wishing to be restricted by this enumeration, are methyl acrylate, methyl methacrylate, ethyl acrylate, ethyl methacrylate, propyl acrylate, propyl methacrylate, n-butyl acrylate, n-butyl methacrylate, n-pentyl acrylate, n-hexyl acrylate, n-hexyl methacrylate, n-heptyl acrylate, n-octyl acrylate, n-nonyl acrylate, lauryl acrylate, stearyl acrylate, stearyl methacrylate, behenyl acrylate, and the branched isomers thereof, such as 2-ethylhexyl acrylate. Further classes of compound for use, which may likewise be added in small amounts under a1), are cyclohexyl methacrylates, isobornyl acrylate, and isobornyl methacrylates.

In one advantageous variant acrylic monomers corresponding to the following general formula are employed for a5):

where $R_1$=H and/or $CH_3$ and the radical —$OR_2$ represents or includes a functional group which assists subsequent UV crosslinking of the pressure-sensitive adhesive—which for example, in one particularly preferred version, possesses an H donor effect.

Particularly preferred examples for component a6) are hydroxyethyl acrylate, hydroxypropyl acrylate, hydroxyethyl methacrylate, hydroxypropyl methacrylate, allyl alcohol, maleic anhydride, itaconic anhydride, itaconic acid, acrylamide, and glyceridyl methacrylate, benzyl acrylate, benzyl methacrylate, phenyl acrylate, phenyl methacrylate, tert-butylphenyl acrylate, tert-butylphenyl methacrylate, phenoxyethyl acrylate, phenoxyethyl methacrylate, 2-butoxyethyl methacrylate, 2-butoxyethyl acrylate, dimethylaminoethyl methacrylate, dimethylaminoethyl acrylate, diethylaminoethyl methacrylate, diethylaminoethyl acrylate, cyanoethyl methacrylate, cyanoethyl acrylate, glyceryl methacrylate, 6-hydroxyhexyl methacrylate, N-tert-butylacrylamide, N-methylolmethacrylamide, N-(butoxymethyl)methacrylamide, N-methylolacrylamide, N-(ethoxymethyl)acrylamide, N-isopropylacrylamide, vinylacetic acid, tetrahydrofurfuryl acrylate, β-acryloyloxypropionic acid, trichloroacrylic acid, fumaric acid, crotonic acid, aconitic acid, and dimethylacrylic acid, this enumeration not being conclusive.

In a further preferred version aromatic vinyl compounds are used for compound a6), the aromatic nuclei being composed preferably of $C_4$ to $C_{18}$ units and being able also to include hetero atoms. Particularly preferred examples are styrene, 4-vinylpyridine, N-vinylphthalimide, methylstyrene, 3,4-dimethoxystyrene, and 4-vinylbenzoic acid, this enumeration not being conclusive.

For the polymerization the monomers are chosen such that the resultant polymers can be employed as heat-activatable adhesives, especially such that the resultant polymers have adhesive properties in accordance with the "Handbook of Pressure Sensitive Adhesive Technology" by Donatas Satas (van Nostrand, New York 1989). For application as a heat-activatable adhesive the static glass transition temperature of the resultant polymer is advantageously above 30° C. For application as a pressure-sensitive adhesive the desired glass transition temperature $T_{g,A}$ is below 15° C. In order to achieve the desired glass transition temperature, in accordance with the remarks above, the monomers are very preferably selected, and the quantitative composition of the monomer mixture advantageously chosen, such that according to the Fox equation (E1) (cf. T. G. Fox, Bull. Am. Phys. Soc. 1 (1956) (123)) the desired $T_{g,A}$ value is produced for the polymer.

$$\frac{1}{T_g} = \sum_n \frac{w_n}{T_{g,n}} \tag{E1}$$

In this equation n represents the serial number of the monomers employed, $w_n$ the mass fraction of the respective monomer n (% by weight), and $T_{g,n}$ the respective glass transition temperature of the homopolymer of the respective monomers n, in K.

For anchoring it may be of advantage if the polymer is corona- or plasma-treated prior to coating. Apparatus suitable for atmospheric plasma treatment includes, for example, those from Plasmatreat.

In a further preferred embodiment of the pressure-sensitive adhesive tape of the invention use is made for the interlayer of polyolefins, especially poly-α-olefins, which preferably have a softening range of more than 30° C. and less than 150° C. and which likewise solidify again after bonding, in the course of cooling. The polyolefin-activatable adhesives have static glass transition temperatures $T_{g,A}$ or melting points $T_{m,A}$, in one preferred embodiment, of +65° C. to 140° C. The bond strength of these polymers can be increased by targeted additizing. Thus, for example, polyimine or polyvinylacetate copolymers can be used as bond strength promoter additives.

In order to achieve the desired static glass transition temperature $T_{g,A}$ or the melting point $T_{m,A}$, the monomers employed and also their amounts, here again, are preferably chosen again such that the desired temperature results when applying the Fox equation (E1).

As well as the monomer or comonomer composition for controlling the glass transition temperature, the molecular weight (weight average Mw) can be varied. In order to set a low static glass transition temperature $T_{g,A}$ or melting point $T_{m,A}$, polymers having a moderate or low molecular weight (weight average Mw) are used. It is also possible to mix together polymers of low and high molecular weight. In particularly preferred versions polyethylenes, polypropenes, polybutenes, polyhexenes or copolymers of polyethylene, polypropene, polybutene or polyhexene are employed.

Available commercially from Degussa under the trade name Vestoplast™ are various heat-activatable poly-α-olefins. Propene-rich grades are offered under the names Vestoplast™ 703, 704, 708, 750, 751, 792, 828, 888 or 891. They possess melting points $T_{m,A}$ of 99 to 162° C. Furthermore, butene-rich grades are also available commercially, under the names Vestoplast™ 308, 408, 508, 520, and 608. They possess melting points $T_{m,A}$ of 84 to 157° C.

Further examples of heat-activatable pressure-sensitive adhesives are described in patents U.S. Pat. Nos. 3,326,741, 3,639,500, 4,404,246, 4,452,955, 4,4043,345, 4,545,843, 4,880,683 and 5,593,759. In these patents there are likewise references to further temperature-activatable pressure-sensitive adhesives.

Production Processes

The multilayer heat-activatable adhesive can be produced by a variety of processes. In a further very preferred process the layers (i) and (ii) and the interlayer(s) are brought together simultaneously in a coextrusion process, using a coextrusion die. The coextrusion of the interlayer(s) is—depending on product construction—optional.

In a further process the adhesive (i), (ii) and the interlayer (s) are applied separately. In a first step the adhesive (i) is coated onto a release paper or release liner or in-process liner. Coating may take place from solution or from the melt. In the case of coating from solution it is preferred—as is usual with the processing of adhesives from solution—to operate with the doctor blade technique, in which case all doctor blade techniques known to the skilled worker may be used. For the preferred application from the melt the solvent—if the polymer is in solution—is stripped off preferably in a concentrating extruder under reduced pressure, something which can be accomplished using, for example, single-screw or twin-screw extruders, which preferably distil off the solvent in different or identical vacuum stages and which possess a feed preheater. Coating then takes place via a melt die or an extrusion die, with the film of adhesive being drawn if desired, in order to achieve the optimum coating thickness.

In a second step the adhesive (ii) is applied from solution or from the melt to the adhesive (i). For coating from solution it is preferred to use solvents which do not activate or dissolve the layer (i). In the case of coating from solution it is preferred—as is usual with the processing of adhesives from solution—to operate with the doctor blade technique, in which case all doctor blade techniques known to the skilled worker may be used. For the preferred application from the melt the solvent—if the polymer is in solution—is stripped off preferably in a concentrating extruder under reduced pressure, something which can be accomplished using, for example, single-screw or twin-screw extruders, which preferably distil off the solvent in different or identical vacuum stages and which possess a feed preheater. Coating then takes place via a melt die or an extrusion die, with the film of adhesive being drawn if desired, in order to achieve the optimum coating thickness. For the multilayer construction with interlayer(s), in the second step, the interlayer(s) is/are coated onto the adhesive layer (i) from solution or from the melt. Optionally in the second step there is also coating onto the adhesive layer (ii) from solution or from the melt, and then lamination to the adhesive layer (i).

In a third process the individual layers are coated separately and then laminated together. The separate coating of the adhesives (i) and (ii) and of the interlayer(s) may take place from solution or else from the melt and in accordance with the processes already described above. Thereafter the layers are laminated together. For this purpose it is very preferable to use a heatable roll system. As a result of the introduction of heat the adhesive layers (i) and (ii) and, where used, the interlayer(s) become tacky and anchoring is significantly improved.

Generally it is possible for improving the anchoring for one, two or all layers with corona and/or plasma and/or flame to be necessary. Also it is possible to use all other methods for increasing the surface tension, such as treatment with chromosulfuric acid or trichloroacetic acid and/or trifluoroacetic acid, for example.

After the coating of the adhesives to give layers (i) and/or (ii) and/or the interlayer(s) it may be necessary to crosslink the layers. For optional crosslinking with UV light, UV-absorbing photoinitiators are added to the adhesives for layers (i) and/or (ii) and/or the interlayer(s). Useful photoinitiators whose use is very effective are benzoin ethers, such as benzoin methyl ether and benzoin isopropyl ether, substituted acetophenones, such as 2,2-diethoxyacetophenone (available as Irgacure 651® from Ciba Geigy®), 2,2-dimethoxy-2-phenyl-1-phenylethanone, dimethoxyhydroxyacetophenone, substituted α-ketols, such as 2-methoxy-2-hydroxypropiophenone, aromatic sulfonyl chlorides, such as 2-naphthylsulfonyl chloride, and photoactive oximes, such as 1-phenyl-1,2-propanedione 2-(O-ethoxycarbonyl)oxime.

The abovementioned photoinitiators and others which may be used, and others of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, aminoketone, azobenzoin, thioxanthone, hexaaryl bisimidazole, triazine or fluorenone radicals, it being possible for each of these radicals to be additionally substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details it is possible to consult Carroy et al. in "Chemistry and Technology of UV and EB Formulation for Coatings, Inks and Paints", Oldring (ed.), 1994, SITA, London.

In principle it is also possible to crosslink the layers with electron beams. Typical irradiation equipment which can be employed includes linear cathode systems, scanner systems or segmented cathode systems where they comprise electron beam accelerators. An exhaustive description of the state of the art and the most important process parameters are found in Skelhorne, Electron Beam Processing, in Chemistry and Technology of UV and EB Formulation for Coatings, Inks and Paints, Vol. 1, 1991, SITA, London. The typical acceleration voltages are in the range between 50 kV and 500 kV, preferably 80 kV and 300 kV. The scatter doses employed range between 5 to 150 kGy, in particular between 20 and 100 kGy.

In a further embodiment it is advantageous to crosslink the layers thermally.

Backing materials used for the multilayer adhesives are the customary materials familiar to the skilled worker, such as films (polyesters, PET, PE, PP, BOPP, PVC, polyimide), nonwovens, foams, woven fabrics and woven films, and also release paper (glassine, HDPE, LDPE). The backing materials ought to be provided with a release layer. In one very preferred version of the invention the release layer is composed of a silicone release varnish or of a fluorinated release varnish.

A further component of the present invention is an adhesively bonded unit comprising a card body, an at least two-layer adhesive film as represented above and described for the use according to the invention, and a chip module.

EXAMPLES

Test Methods:

Iso Bending A)

The Iso bending test is carried out in analogy to Iso/IEC 10373: 1993 (E) Section 6.1. The test is passed if a total of more than 4000 bends are attained.

Extreme Bending Test B)

In the extreme bending test a section 3 cm wide, with the electrical module located in the centre, is cut from the chip card and then compressed from 3 cm wide to 2.5 cm wide 10×. The test is passed if the electrical module does not come out.

Hand Test C)

In the hand test the chip card is bent by hand, via one of the two corners lying nearer to the electrical module, to an extent such that the card breaks or the module breaks. The test is then passed. If the electrical module parts or jumps out, the test is failed.

All trade names describe the products as they were available commercially on the priority date.

Example 1 tesa HAF 8405® (30 µm adhesive layer thickness, based on a nitrile rubber and a phenolic resin, =adhesive layer (ii)) is coated using an SIG single-screw extruder and a Breyer extrusion die (300 µm slot) at 170° C. with a tesa HAF 8440® (adhesive layer 45 µm based on non-reactivatable copolyamides, =adhesive layer (i)). Before being wound up, the assembly is passed over a chill roll.

Example 2 tesa HAF 8405® (30 µm adhesive layer thickness, based on a nitrile rubber and a phenolic resin, =adhesive layer (ii)) is coated using an SIG single-screw extruder and a Breyer extrusion die (300 µm slot) at 170° C. with a copolyester (Grilltex™ 1616, EMS-Grilltex, =adhesive layer (i)). The layer thickness of the copolyester is subsequently 50 µm. Before being wound up, the assembly is passed over a chill roll.

Example 3

The polyurethane (Pearlthane™ D 12F75, Danquinsa, =adhesive layer (ii)), using an SIG single-screw extruder and a Breyer extrusion die (300 µm slot), is heated to 170° C. and coated under pressure onto a release paper coated with about 1.5 g/m² polydimethylsiloxane. The layer thickness of the adhesive layer (ii) after coating was 40 µm. Subsequently, in a second step, coating takes place with a tesa HAF 8440 (adhesive layer 45 µm based on copolyamide, =adhesive layer (i)) onto layer (ii). Before being wound up, the assembly is passed over a chill roll.

Implantation of Electrical Modules

The electrical modules were implanted in the card body using an implanter from Ruhlamat Testplatz Modul. The materials employed were as follows.

Electrical modules: Nedcard Dummy, tape-type: 0232-10

PVC cards: CCD

ABS card: ORGA

In a first step Examples 1 to 3 are laminated onto the Nedcard module belt with 2 bar using a two-roll laminating unit from Storck GmbH. It should be ensured here that the adhesive layer (i) is coated directly onto the module belt.

The electrical modules are then implanted into the matching cavity in the card body. The parameters employed for all the examples were as follows:

Heating steps: 2

Punch temperature: 190° C.

Time: 2×1 s

Cooling step: 1×800 ms, 25° C.

Pressure: 70 N per module

Results:

The chip cards produced with the inventive adhesives were tested according to test methods A, B and C. The results are set out in Table 1.

| Examples | Test method A | Test method B | Test method C |
|---|---|---|---|
| 1 | Passed | Passed | passed |
| 2 | Passed | Passed | passed |
| 3 | Passed | Passed | passed |

Table 1 reveals that all of the inventive examples passed the most important criteria for a chip card and are therefore highly suitable for the adhesive bonding of electrical modules to card bodies.

What is claimed is:

1. A method comprising bonding a chip module in a card body with an adhesive comprising at least two adhesive layers (i) and (ii), wherein the adhesive layer (i) exhibits high bonding compatibility with epoxy materials and/or polyimides, wherein the adhesive layer (ii) is based on polyurethanes and/or rubbers, wherein the adhesive layer (ii) bonds the adhesive layer (i) to the card body.

2. The method of claim 1, wherein an adhesive of the adhesive layers (i) is pressure sensitive adhesive.

3. The method of claim 1, wherein the adhesive (ii) exhibits high bonding compatibility with polycarbonate, polyethylene, polypropylene, acrylonitrile-butadiene-styrene copolymer plastics, polyethylene terephthalate and/or polyvinyl chloride.

4. The method of claim 1, wherein layer (i) is based on thermoplastic polymers.

5. The method of claim 4, wherein the thermoplastic polymers are selected from the group consisting of thermoplastic polymers based on polyesters, polyamides, copolyesters and/or copolyamides.

6. The method of claim 1, wherein layer (ii) is based on synthetic rubbers.

7. The method of claim 1, wherein between layer (i) and layer (ii) there are one or more further layers.

8. The method of claim 7, wherein the one or more further layers comprise one or more primer, barrier and/or carrier layers.

9. A method comprising bonding a chip module in a card body with an adhesive comprising at least two adhesive layers (i) and (ii), wherein the adhesive layer (i) exhibits high bonding compatibility with epoxy materials and/or polyimides, wherein layer (ii) is based on a heat-activatable system composed of an elastomer and at least one reactive resin, wherein the elastomer is composed of at least one of rubbers, polychloroisoprenes, polyacrylates, nitrile rubbers and/or epoxidized nitrile rubbers and/or the reactive resin is composed of at least one of phenolic resins, epoxy resins, melamine resins and/or resins with isocyanate function, wherein the adhesive layer (ii) bonds the adhesive layer (i) to the card body.

10. An adhesive unit consisting of a card body, an adhesive film and a chip module, wherein the adhesive film comprises at least two adhesive layers (i) and (ii), wherein the adhesive layer (i) exhibits high bonding compatibility with epoxy materials and/or polyimides, wherein layer (ii) is based on polyurethanes and/or rubbers, wherein the adhesive layer (ii) is bonded to the adhesive layer (i) and the card body.

* * * * *

UNITED STATES PATENT AND TRADEMARK OFFICE
CERTIFICATE OF CORRECTION

PATENT NO. : 7,562,827 B2 Page 1 of 1
APPLICATION NO. : 10/569339
DATED : July 21, 2009
INVENTOR(S) : Bargmann et al.

It is certified that error appears in the above-identified patent and that said Letters Patent is hereby corrected as shown below:

(73) Assignee, "Tesa SE, Hamburg (DE)" should read -- tesa SE, Hamburg (DE) --.

Column 5, line 29, "$\geqq$" should read -- $\geq$ --.

Signed and Sealed this

Twenty-fourth Day of August, 2010

David J. Kappos
*Director of the United States Patent and Trademark Office*